United States Patent
Casserly et al.

(10) Patent No.: US 9,740,981 B2
(45) Date of Patent: *Aug. 22, 2017

(54) PERFORMING SUB-SYSTEM ATTRIBUTE MODIFICATION

(71) Applicant: International Business Machines Corporation, Armonk, NY (US)

(72) Inventors: Karl O. Casserly, Valley Stream, NY (US); Bohdan Demczar, Hyde Park, NY (US); Dale E. Hoffman, Fishkill, NY (US); William P. Kostenko, Poughkeepsie, NY (US); John G. Torok, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 389 days.

This patent is subject to a terminal disclaimer.

(21) Appl. No.: 14/513,242

(22) Filed: Oct. 14, 2014

(65) Prior Publication Data

US 2015/0149485 A1    May 28, 2015

Related U.S. Application Data

(63) Continuation of application No. 14/087,020, filed on Nov. 22, 2013.

(51) Int. Cl.
  *G06N 5/04* (2006.01)
  *G06Q 10/06* (2012.01)

(52) U.S. Cl.
  CPC ............... *G06N 5/04* (2013.01); *G06Q 10/06* (2013.01)

(58) Field of Classification Search
  None
  See application file for complete search history.

(56) References Cited

U.S. PATENT DOCUMENTS

| | | | | |
|---|---|---|---|---|
| 6,078,946 A * | 6/2000 | Johnson | ............... | H04L 41/0806 709/200 |
| 6,826,552 B1 * | 11/2004 | Grosser | ................. | G06Q 30/02 706/45 |
| 7,603,367 B1 * | 10/2009 | Kanter | .................... | G06F 17/30 707/999.003 |
| 9,495,652 B1 * | 11/2016 | Cook | ............... | G06Q 10/06313 |
| 2004/0034552 A1 | 2/2004 | Cole | | |
| 2004/0034553 A1 | 2/2004 | Cole | | |

(Continued)

OTHER PUBLICATIONS

U.S. Appl. No. 14/087,020, filed Nov. 22, 2013.

*Primary Examiner* — Paulinho E Smith
*Assistant Examiner* — Benjamin Buss
(74) *Attorney, Agent, or Firm* — Lieberman & Brandsdorfer, LLC

(57) ABSTRACT

A tool and technique are employed to distill and prioritize multiple organizational (sub-system) capabilities based on ranked customer requirements or desires. A translational matrix is employed to organize preferences of the sub-system with respect to the customer requirements or desires. Relative importance scores are input into the matrix to reflect prioritized input versus prioritized capabilities. An adjusted relative importance score of the sub-system is automatically calculated and a resultant re-prioritization of sub-system attributes is created for application to new designs, services, or processes.

8 Claims, 6 Drawing Sheets

(56) References Cited

U.S. PATENT DOCUMENTS

| | | | | |
|---|---|---|---|---|
| 2005/0261953 A1* | 11/2005 | Malek | ................... | G06N 3/126 |
| | | | | 705/7.32 |
| 2007/0282651 A1* | 12/2007 | Naik | ..................... | G06Q 10/06 |
| | | | | 705/7.12 |
| 2008/0120129 A1* | 5/2008 | Seubert | ................. | G06Q 10/06 |
| | | | | 705/35 |
| 2011/0225077 A1 | 9/2011 | Levitt | | |

* cited by examiner

FIG. 2

PERFORMING SUB-SYSTEM ATTRIBUTE MODIFICATION

CROSS REFERENCE TO RELATED APPLICATION(S)

This application is a continuation patent application claiming the benefit of the filing date of U.S. patent application Ser. No. 14/087,020 filed on Nov. 22, 2013 and titled "Performing Sub-System Attribute Modification" now pending, which is hereby incorporated by reference.

BACKGROUND

TECHNICAL FIELD

The present invention relates to decision based matrix manipulation for sub-system attribute modification. More specifically, the invention relates to employment of a matrix for quantitative scoring and prioritization of critical requirements in relation to sub-system requirements.

Large enterprises contain a plurality of sub-systems to support different aspects of the enterprise. Examples of such sub-systems include, but are not limited to, manufacturing, service, development, firmware, etc. In general, each of the subsystems has a set of attributes that can be associated to needs and requirements of the enterprise. Each subsystem may have an assessment of the priority of their attributes. At the same time, the enterprise may have a different assessment of prioritization of the subsystems.

SUMMARY OF THE INVENTION

This invention comprises a method for analytically prioritizing sub-system attributes through matrix manipulation.

In one aspect, a method is provided for relating sets of preferences in a translational matrix. A first class of attributes with a first set of preferences is prioritized, with the prioritization producing a first weighted ranking score. Similarly, a second class of attributes with a second set of preferences is prioritized, with the prioritization producing a second weighted ranking score. The prioritized first and second sets of preferences are translated as attributes to a solution. The aspect of translation includes: assigning a weighted ranking score to each attribute in the first set of preferences relative to each attribute in the second set of preferences, aggregating the assigned score with the first set of preferences, with the aggregation utilizing an associated attribute from each of the first and second sets of preferences, assigning each aggregation to a modified attribute, and quantitatively adjusting the second set of preferences based on the modified attribute. Following the translation process, the second class of attributes is organized with respect to the first class of attributes.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

FIG. 2 depicts a translational matrix for sub-system attribute modification.

DETAILED DESCRIPTION

Figure 1A:
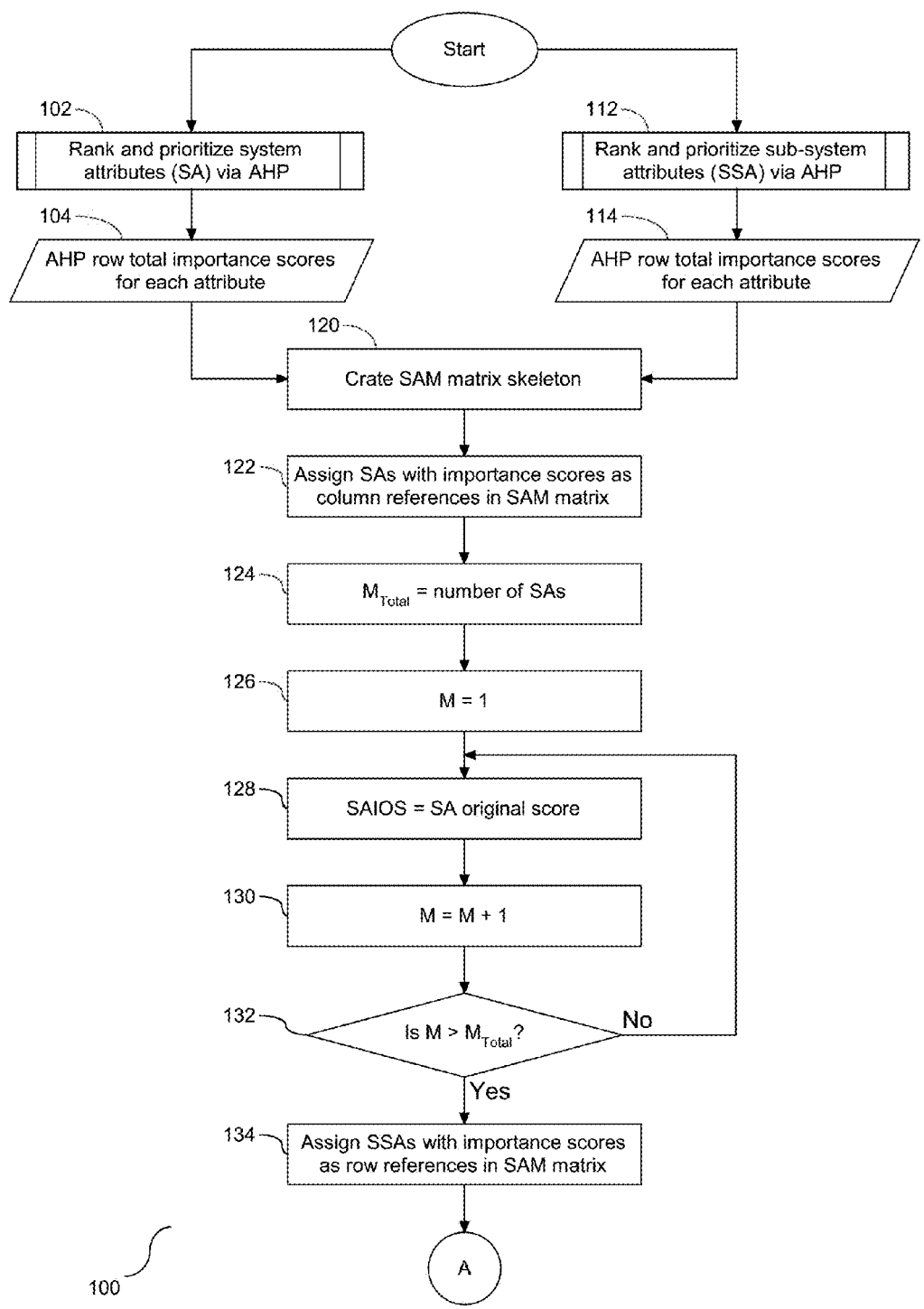
FIGS. 1A, 1B, and 1C depict a flow chart for applying system customer attributes to sub-systems.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional unit described in this specification has been labeled with tools, modules, and/or managers. The functional unit may be implemented in programmable hardware devices such as field programmable gate arrays, programmable array logic, programmable logic devices, or the like. The functional unit may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of an identified functional unit need not be physically located together, but may comprise disparate instructions stored in different locations which, when joined logically together, comprise the functional unit and achieve the stated purpose of the functional unit.

Indeed, a functional unit of executable code could be a single instruction, or many instructions, and may even be distributed over several different code segments, among different applications, and across several memory devices. Similarly, operational data may be identified and illustrated herein within the functional unit, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of managers, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

A tool and associated technique are provided to distill and prioritize multiple organizational capabilities based on a ranked voice of customer requirements or desires. In one embodiment, the organization capabilities pertain to a storage sub-system. The technique employs an analysis of relative importance assignment scores that are input into a matrix of customer priorities and sub-system prioritized capabilities. An adjusted relative importance score of the sub-system is automatically calculated and a resultant re-prioritization of sub-system attributes is created for application to new designs, services, or processes.

Figure 1B:
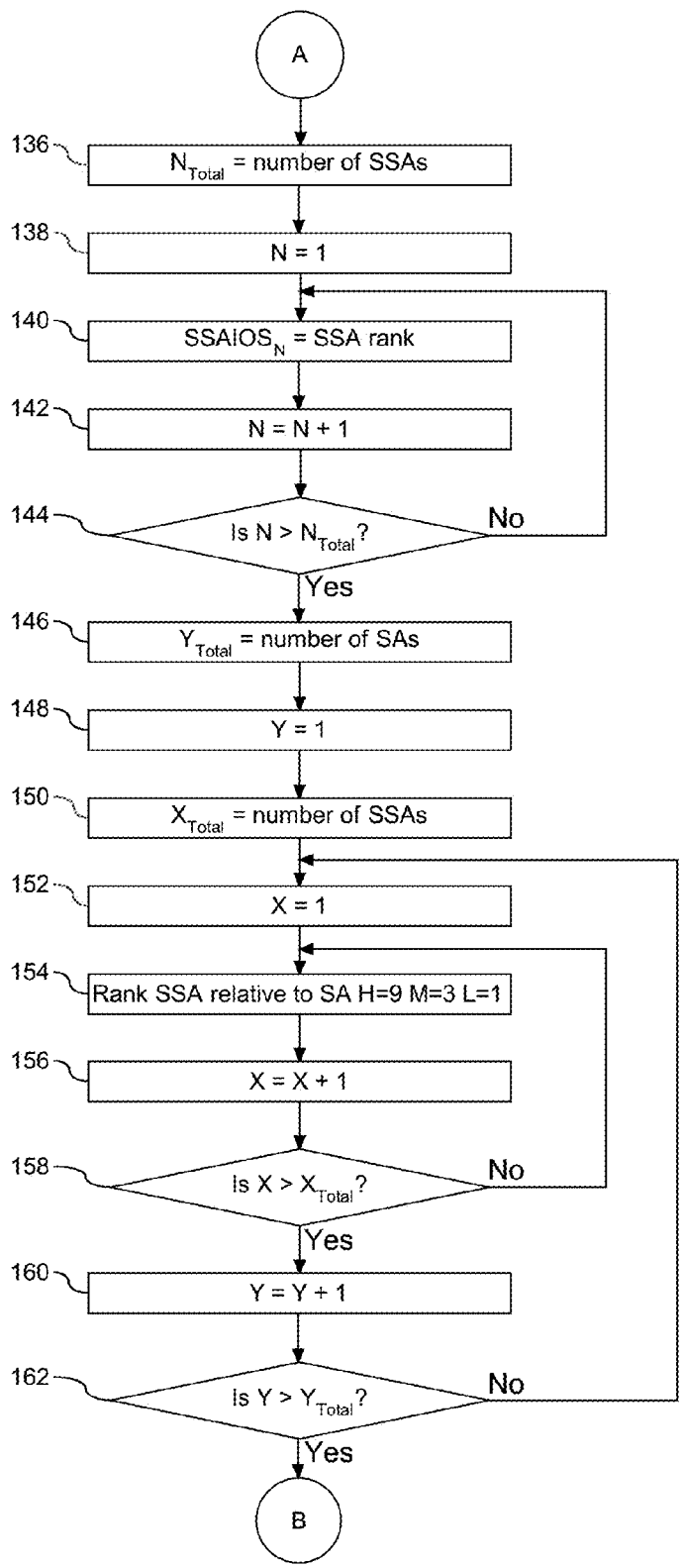
Figure 1C:
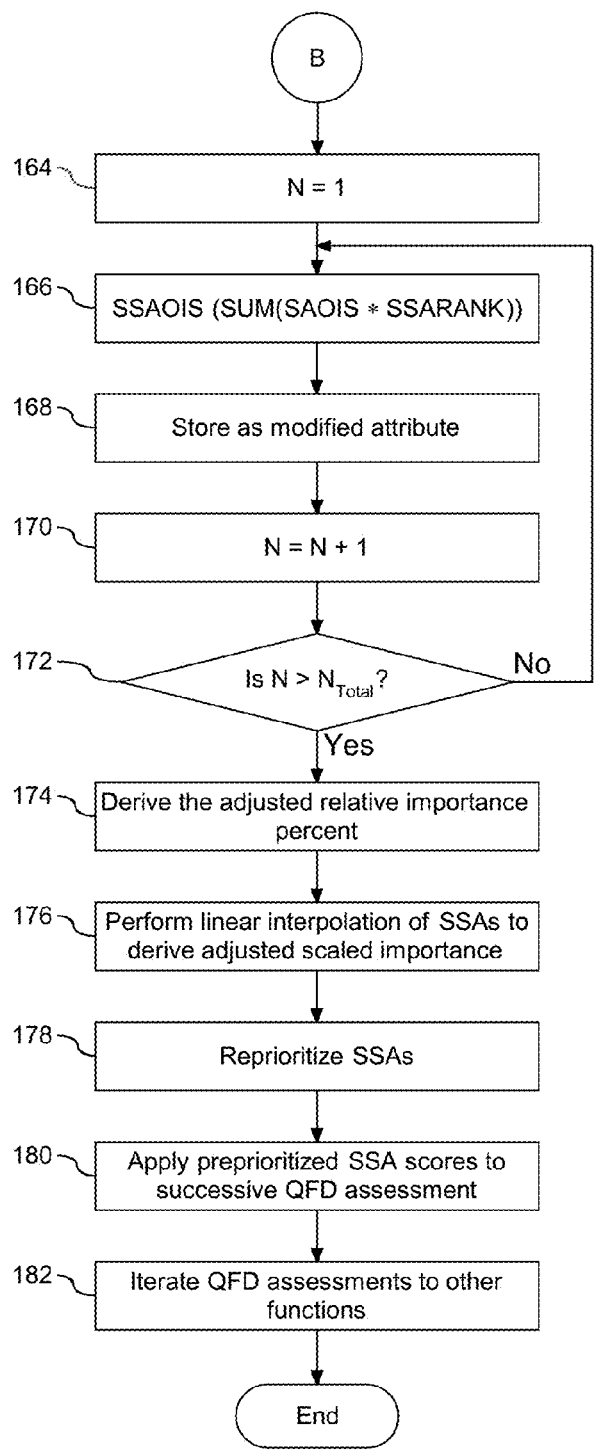

FIG. 1 is a flow chart (100) illustrating a process for applying system customer attributes to sub-systems. There are two sets of inputs to the system attribute matrix, including a rank and prioritization of system attributes (102) and a rank and prioritization of sub-system attributes (112). These attributes may be ranked and prioritized by a separate analytical hierarchical process (AHP). Following the rank and prioritization of system attributes at step (102), a row of importance scores for each attribute is totaled (104). Similarly, following the rank and prioritization of sub-system attributes at step (112), a row of importance scores for the associated attributes is totaled (114). A system attribute modification matrix is created with the row totals at steps (104) and (114) serving as input (120).

System attributes with importance scores are assigned as column references in the system attribute modification matrix (122). The variable $M_{Total}$ is assigned to the quantity of system attributes (124), and an associated counting variable M is initialized (126). The original system attribute ranking is assigned to the variable $SAIOS_M$ (128), followed by an increment of the counting variable M (130). It is then determined if all of the system attributes in the matrix have been evaluated (132). A negative response to the determination at step (132) is followed by a return to step (128), and a positive response concludes the original score assignment. A similar process is conducted for each of the sub-system attributes. Namely, the sub-system attributes with importance scores are assigned as row references in the system attribute modification matrix (134). The variable $N_{Total}$ is assigned to the quantity of sub-system attributes (136), and an associated counting variable N is initialized (138). The original sub-system attribute ranking is assigned to the variable $SSAIOS_N$ (140), followed by an increment of the counting variable N (142). It is then determined if all of the sub-system attributes in the matrix have been evaluated (144). A negative response to the determination at step (144) is followed by a return to step (140), and a positive response concludes the original score assignment.

Ranking of sub-system attributes relative to system attributes is based on a numerical assignment. In one embodiment, one of three values may be assigned to the ranking, including high, medium, and low, with a high having the integer value of nine, medium having the integer of three, and low having the integer value of one. The ranking is for each sub-system attribute relative to each system attribute. Specifically, the variable $Y_{Total}$ represents all of the system attributes (146), and an associated counting variable Y is initialized (148). In addition, the variable $X_{Total}$ represents all of the sub-system attributes (150), and an associated counting variable X is initialized (152). Each system attribute Y is ranked relative to each sub-system attribute X (154). Following the ranking, the sub-system variable X is incremented (156), and it is determined if all of the sub-system attributes X have been processed (158). A negative response to the determination is followed by a return to the ranking step (154). However, a positive response is followed by an increment of the system attribute counting variable, Y (160), and a determination of whether all of the system attributes have been processed through the ranking (162). A negative response to the determination at step (162) is followed by a return to step (152). Conversely, a positive response to the determination at step (162) concludes the ranking process.

Following the ranking process, a modified sub-system importance score is calculated for each sub-system attribute. The sub-system attribute counting variable N is initialized (164). For sub-system attribute N, the calculation is the product of the original sub-system attribute ranking with the sum of the product of the original system attribute ranking and the sub-system attribute ranking (166). Following step (166), the calculation is stored as a modified attribute (168), and the sub-system attribute counting variable N is incremented (170). It is then determined if the value of the counting variable is equal to the quantity of sub-system attributes (172). A negative response to the determination at step (172) is followed by a return to step (166), and a positive response concludes the calculation of the modified sub-system attribute importance score.

Once all of the modified important scores are completed, an adjusted relative importance percentage is derived (174). In addition, a linear interpolation of sub-system attributes is performed to derive an adjusted scaled importance (176). Based upon the adjusted importance, the sub-system attributes are re-prioritized (178). In one embodiment, the re-prioritization may be applied to a successive quality function and deployment assessment (180), followed by iteration of quality function and deployment assessments to other functions (182). Accordingly, customer and sub-system attributes are brought together, and sub-system attributes are adjusted based on customer designated system attributes and their rankings.

As shown in FIG. 1, a set of diverse product data sets are incorporated into decision based activities. More specifically, a decision tree captures data and customer responses and employs a matrix manipulation algorithm to modify a leading set of customer associated data into working sets of rank-ordered attributes. In one embodiment, the rank-ordered attributes are then applied to a product's development.

Figure 2:
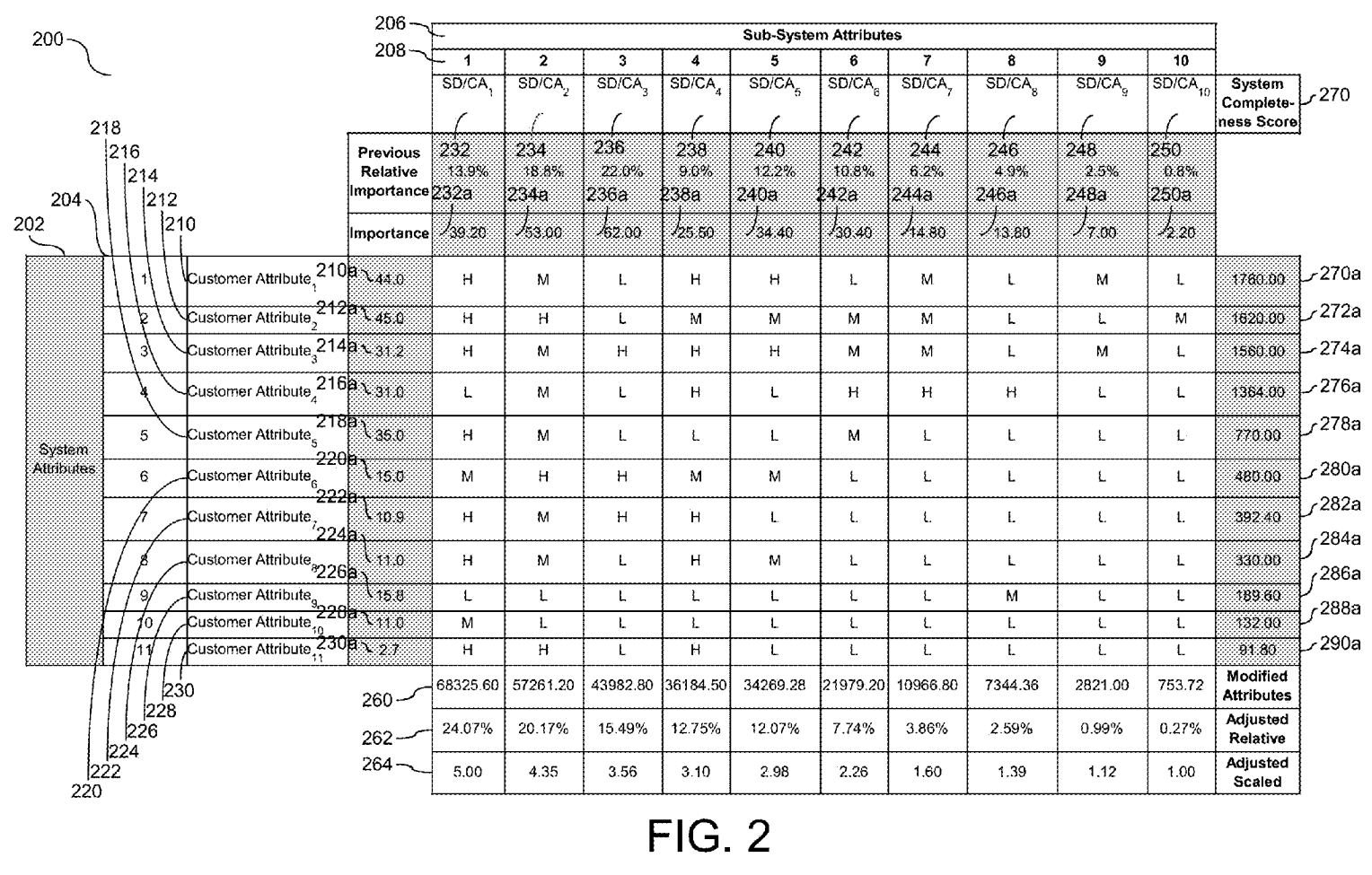

To further illustrate the matrix manipulation and application, a sample matrix (200) is shown in FIG. 2. As shown, there are two sets of attributes, one on a horizontal axis and one on a vertical axis, although in one embodiment, the matrix may be inverted. Accordingly, the position of the attributes shown on the matrix is for illustrative purposes. In this example matrix, system attributes as defined by a customer are shown on the horizontal axis (202). Customer attributes are also known as requirements under which the customer needs a system designed. Although an order (204) of the customer attributes is shown, in one embodiment, this ordering is not relevant to the assessment and re-ordering of the attributes. Each of the customer attributes is assigned an importance score. Specifically, in the example shown herein, there are eleven defined customer attributes (210)-(230). Each of the customer attributes has an importance designation (210a)-(230a). Sub-system attributes define requirements to produce the system. In the example shown herein, the sub-system attribute are exhibited on the vertical axis (206). An order (208) of the sub-system attributes is shown, and in one embodiment, this ordering is not relevant to the assessment and re-ordering of attributes. In the example shown herein, there are ten sub-system attributes (232)-(250). Each of the sub-system attributes has an importance designation (232a)-(250a).

As shown in FIG. 2, the customer attributes are arranged in a matrix relative to the sub-system attributes. Scores of importance are individually assigned to each of the attributes in both of the sets. In addition, an individual score is assigned to each customer system attribute with respect to each sub-system attribute. As shown, in the matrix, the scores are high, medium, and low. In one embodiment, additional or alternative scoring may be employed. Similarly, in one embodiment, each of the scores has a separate underlying numerical value. For example, in the embodiment shown herein high has a numerical value of nine, medium has a numerical value of three, and low has a numerical value of one. In one embodiment, the numerical values may vary from those shown and described herein. Each of the attributes and the associated scores are aggregated. Specifically, there is a horizontal aggregation (252) and a vertical aggregation (254). The horizontal aggregation (252) is used for a sanity check. More specifically, the horizontal aggregation is employed to compare with the customer ranked importance of attributes in the event where there is an assessment of the initial assignment of importance with respect to the actual assessment following import of the assigned scores to each of the attributes.

As shown, the scores are assessed both vertically and horizontally. The vertical assessment provides a modified importance of each attribute (260) based on the assigned scores in the matrix. Each modified importance value is a raw value and is assessed in comparison to an aggregation of each of the attributes and their associated modified importance score. As shown, the sub-system attribute has an adjusted relative importance value (262). In one embodiment, the value at (262) is a percentage of the importance in comparison to the totality of the modified importance (260). The values at (262) are adjusted based on a scaled level of importance. In the embodiment shown herein, the scale ranges from one to five. Each of the sub-system attributes is assigned a value in the scale (264), with the value based on an interpolation within the scale. In one embodiment, the scaled value is an integer, and in another embodiment the scaled value is not limited to an integer.

In one embodiment, a system completeness score (270) is assessed within the matrix. The completeness score is a summation of each customer attribute across the sub-system attributes. Each completeness score (270) for each customer attribute may be compared to the initial importance assignment (210a)-(230a). In one embodiment, the comparison of the completeness scores (270a)-(290a) provides a sanity check with the customer ranked importance attributes. Accordingly, the matrix provides an organization for bringing together customer and sub-system attributes, and further provides data for adjustment of sub-system design.

As will be appreciated by one skilled in the art, aspects of the present invention may be embodied as a system, method or computer program product. Accordingly, aspects of the present invention may take the form of an entirely hardware based embodiment, an entirely software based embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer or mobile device (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
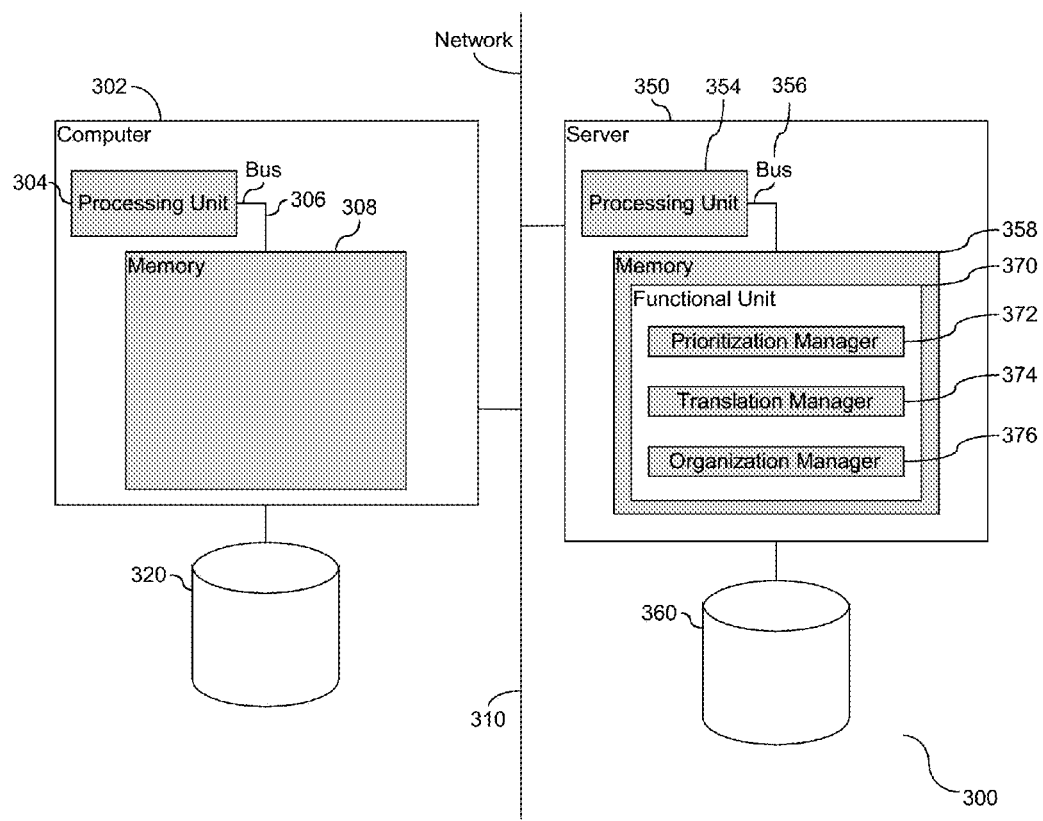
FIG. 3 depicts a block diagram showing a system for sub-system attribute modification.

The process shown in FIG. 1 may be embodied as hardware components. FIG. 3 illustrates a system (300) for quantitative scoring and prioritization of critical requirements in relation to sub-system modification(s). A computer or related computing device (302) is provided in communication with data storage (320). The computer or related device (302) includes a processing unit (304) in communication with memory (308) across a bus (306). The computer or related device (302) is in communication with a server (350) across a network connection (310). While only one server (350) and computer (302) are depicted, any number of servers and computers may be implemented. The server (350) includes a processing unit (354) in communication with memory (358) across a bus (356). At the same time, the server (350) is in communication with data storage (360). A functional unit (370) is provided embedded in memory (358), and includes tools to support functionality associated with attribute modification. The tools include, but are not limited to, a prioritization manager (372), a translation manager (374), and an organization manager (376). Together, the managers (372)-(376) function to provide sub-system modified attributes based on requirements and prioritization.

The server (350) is provided with data storage (360), which in one embodiment stores the matrix (362). Similarly, in one embodiment, the matrix is stored on a remote data center (not shown) in communication with the server (350) across the network connection (310). The server (650) provides a venue for facilitating sub-system design and/or modification. As noted above, the prioritization manager (372) functions in communication with the processing unit (304). More specifically, the prioritization manager (372) prioritizes a first class of attributes with a first set of preferences to produce a first weighted ranking score, and prioritizes a second class of attributes with a second set of preferences to produce a second weighted ranking score. Weighting of the scores enables the preferences to be emphasized or de-emphasized in the ranking process. As shown, there are two different sets of preferences. In one embodiment, one set of preferences is based upon system design components and their functionality, and another set of preferences is based upon customer requirements. System design functionality and customer requirements may have different sets of prioritizations. The translation manager (374) communicates with the prioritization manager (374) to translate the prioritized first set and second set of preferences as attributes to a solution. In one embodiment, the solution is the design of a sub-system, or a modification of a sub-system design.

Translation of the two sets of preferences requires reconciliation so that the sub-system complies with internal design requirements while meeting the needs and requirements of the customer. To facilitate the reconciliation, the translation manager (374) assigns a weighted ranking score to each attribute in the first set of preferences relative to each attribute in the second set of preferences, aggregates the assigned score with the first set of preferences, the aggregation to utilize an associated attribute from each of the first and second sets of preferences, assigns each aggregation to a modified attribute, and quantitatively adjusts the second set of preferences based on the modified attribute. In one embodiment, a series of scripts support the functionality of the translation manager (374). Based upon the quantitative adjustments set forth, an organization manager (376) organizes the second set of preferences with respect to the first class of attributes. Accordingly, the translation manager (374) functions to provide a quantitative scoring and prioritization of critical requirements in relation to sub-system requirements, and the organization manager (376) functions to relates the two sets of scores and prioritized preferences.

As articulated above, there are at least two sets of scores, although in one embodiment, there may be additional scores. In one embodiment, a translational matrix is employed to correlate the preferences and their associated scores. Similarly, one of the scores is referred to herein as an importance score, and it is assigned to the first set of preferences as a column reference and to the second set of preferences as a row reference within the translational matrix. Another score is referred to herein as a revised weighted ranking score. This score is produced by analytically deriving a relative importance of the first set of preferences with respect to the second set of preferences. As articulated, the first set of preferences is adjusted with respect to the second set of preferences. A linear interpolation is employed to calculate an adjustment relative to the importance of the second set of preferences. The adjustment enhances the preferences set by the customer within the framework of the sub-system requirements. Accordingly, managers support the decision based activities to modify a leading set of customer associated data into working sets of rank ordered attributes.

The tools shown herein employ the processing unit(s) to support their computations for sub-system modification. As described in FIG. 1, computations are performed in association with matrix manipulation. Furthermore, as identified above, the managers (372)-(376) are shown residing in memory (358) of the server (350). In one embodiment, the managers (372)-(376) may individually or collectively reside as hardware tools external to the memory (358). In another embodiment, the managers (372)-(376) may be implemented as a combination of hardware and software in a shared pool of resources. Similarly, in one embodiment, the managers (372)-(376) may be combined into a single functional item that incorporates the functionality of the separate items. As shown herein, each of the managers (372)-(376) are shown local to the server (350). However, in one embodiment, they may be collectively or individually distributed across a shared pool of configurable computer resources and function as a unit to support sub-system attribute modification. Accordingly, the tools may be implemented as software tools, hardware tools, or a combination of software and hardware tools.

The described features, structures, or characteristics may be combined in any suitable manner in one or more embodiments. Examples of the managers have been provided to lend a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The functional unit described above in FIG. 3 has been labeled with managers. The managers may be implemented in programmable hardware devices such as field programmable gate arrays, programmable array logic, programmable logic devices, or the like. The manager(s) may also be implemented in software for processing by various types of processors. An identified manager of executable code may, for instance, comprise one or more physical or logical blocks of computer instructions which may, for instance, be organized as an object, procedure, function, or other construct. Nevertheless, the executable of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Figure 4:
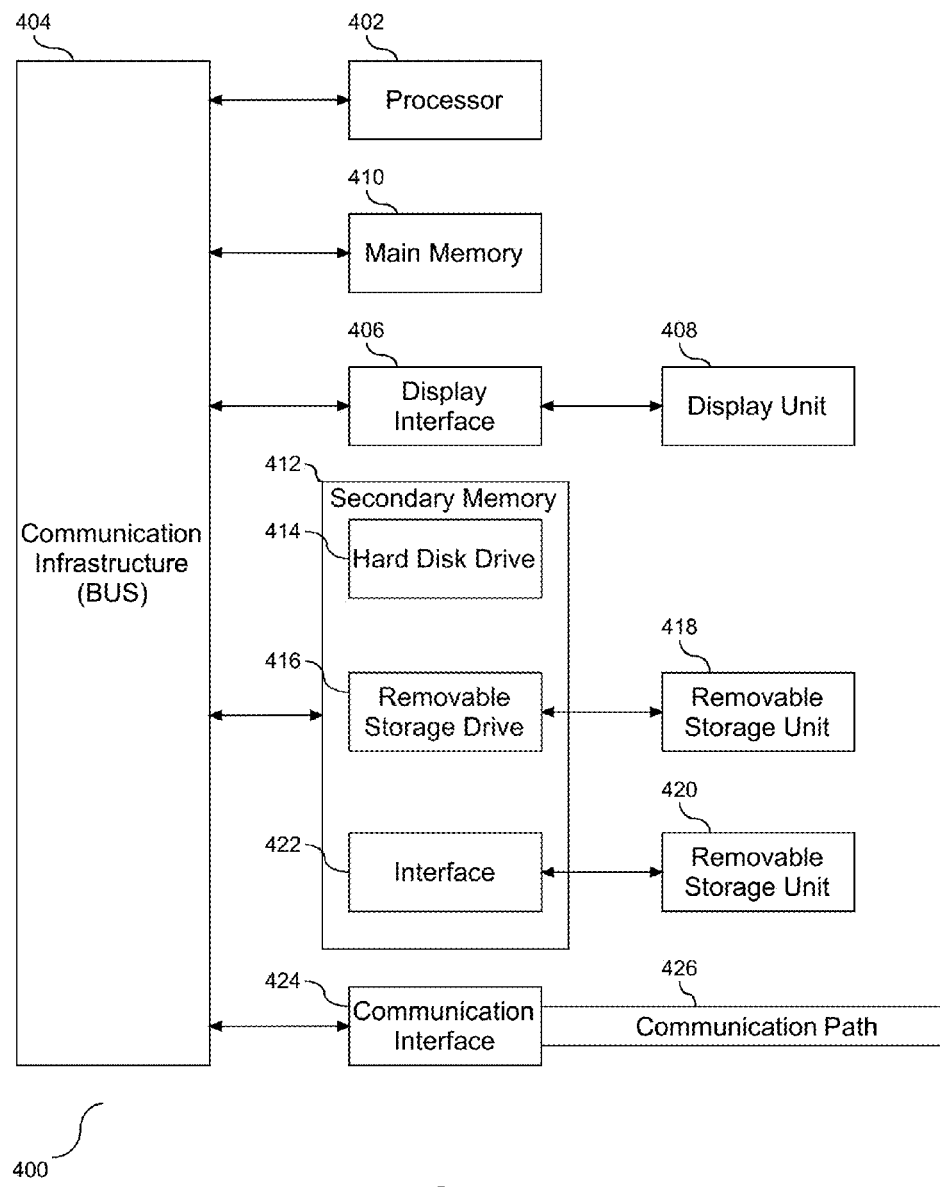
FIG. 4 depicts a block diagram showing a system for implementing an embodiment of the present invention.

Referring now to the block diagram (400) of FIG. 4, additional details are now described with respect to implementing an embodiment of the present invention. The computer system includes one or more processors, such as a processor (402). The processor (402) is connected to a communication infrastructure (404) (e.g., a communications bus, cross-over bar, or network).

The computer system can include a display interface (406) that forwards graphics, text, and other data from the communication infrastructure (404) (or from a frame buffer not shown) for display on a display unit (408). The computer system also includes a main memory (410), preferably random access memory (RAM), and may also include a secondary memory (412). The secondary memory (412) may include, for example, a hard disk drive (414) (or alternative persistent storage device) and/or a removable storage drive (416), representing, for example, a floppy disk drive, a magnetic tape drive, or an optical disk drive. The removable storage drive (416) reads from and/or writes to a removable storage unit (418) in a manner well known to those having ordinary skill in the art. Removable storage unit (418) represents, for example, a floppy disk, a compact disc, a magnetic tape, or an optical disk, etc., which is read by and written to by a removable storage drive (416). As will be appreciated, the removable storage unit (418) includes a computer readable medium having stored therein computer software and/or data.

In alternative embodiments, the secondary memory (412) may include other similar means for allowing computer programs or other instructions to be loaded into the computer system. Such means may include, for example, a removable storage unit (420) and an interface (422). Examples of such means may include a program package and package interface (such as that found in video game devices), a removable memory chip (such as an EPROM, or PROM) and associated socket, and other removable storage units (420) and interfaces (422) which allow software and data to be transferred from the removable storage unit (420) to the computer system.

The computer system may also include a communications interface (424). Communications interface (424) allows software and data to be transferred between the computer system and external devices. Examples of communications interface (424) may include a modem, a network interface (such as an Ethernet card), a communications port, or a PCMCIA slot and card, etc. Software and data transferred via communications interface (424) are in the form of signals which may be, for example, electronic, electromagnetic, optical, or other signals capable of being received by communications interface (424). These signals are provided to communications interface (424) via a communications path (i.e., channel) (426). This communications path (426) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (410) and secondary memory (412), removable storage drive (416), and a hard disk installed in hard disk drive or alternative persistent storage device (414).

Computer programs (also called computer control logic) are stored in main memory (410) and/or secondary memory (412). Computer programs may also be received via a communication interface (424). Such computer programs, when run, enable the computer system to perform the features of the present invention as discussed herein. In particular, the computer programs, when run, enable the processor (402) to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Specifically, in one embodiment, a series of scripts are employed to analytically prioritize the system and sub-system attributes through matrix manipulation. Accordingly, the scope of protection of this invention is limited only by the following claims and their equivalents.

We claim:

1. A method comprising:
   prioritizing two or more first attributes based on a first set of preferences including producing a first importance score for each first attribute;
   prioritizing two or more second attributes based on a second set of preferences including producing a second importance score for each second attribute;
   individually ranking each first attribute relative to each second attribute, including assigning one or more ranking scores to each first attribute;
   creating a modified attribute score for each first attribute, including aggregating at least one ranking score assigned to a select first attribute, the first importance score of the select first attribute, and the second importance score of each second attribute;
   comparing the modified attribute score of each first attribute;
   quantitatively adjusting each modified attribute score based on the comparison;
   re-prioritizing the first attributes based on the quantitative adjustment, including organizing the first attributes with respect to the second attributes within a translational matrix; and
   translating the translational matrix into one or more third attributes of a solution.

2. The method of claim 1, further comprising assigning a third importance score to the first attributes as a column reference and to the second attributes as a row reference within the translational matrix.

3. The method of claim 2, further comprising producing a weighted ranking score by analytically deriving a relative importance of the first attributes with respect to the second attributes.

4. The method of claim 3, further comprising performing a linear interpolation of the quantitatively adjusted modified attribute score of each first attribute to create a scaled importance score.

5. The method of claim 4, creating a second translational matrix prioritizing the first attributes relative to one or more third attributes.

6. The method of claim 5, analytically deriving an adjusted scaled importance of the third attributes.

7. The method of claim 6, creating a third translational matrix, including assigning the third attribute of the second translational matrix in a column of the third translational matrix, and assigning one or more second importance scores as column references.

8. The method of claim 7, further comprising summarizing a final set of re-prioritized attributes.

* * * * *